Dec. 15, 1936.  F. H. BENGE  2,064,723
GEARING
Filed Aug. 13, 1935
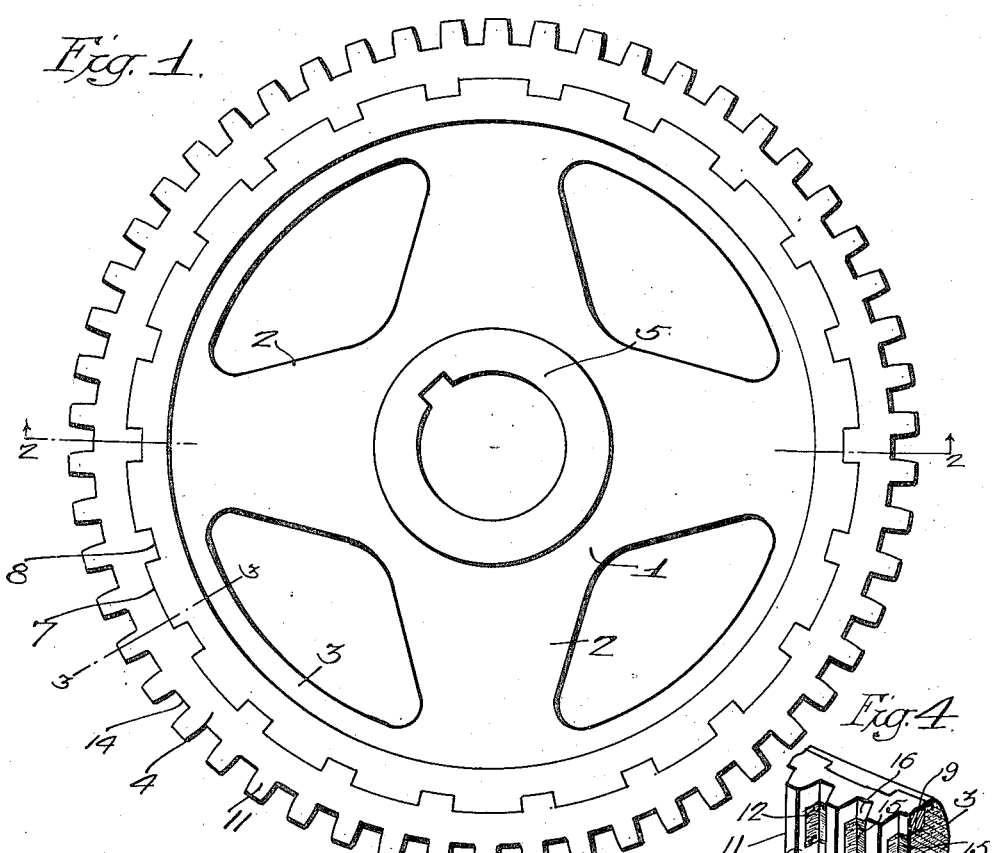
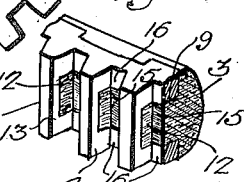
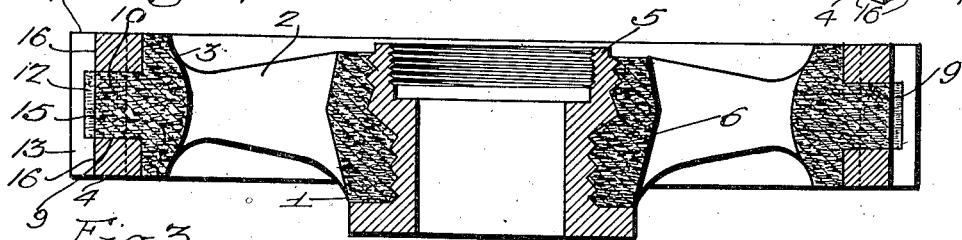
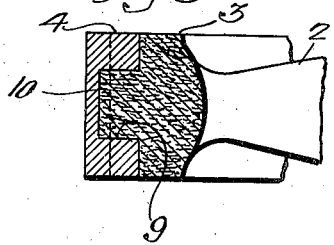
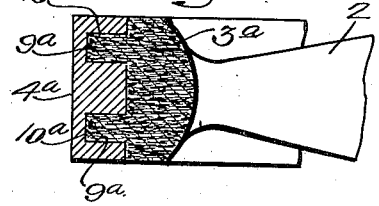
Inventor
Frank H. Benge
By his Attorneys
Howson & Howson Patented Dec. 15, 1936

2,064,723

UNITED STATES PATENT OFFICE 2,064,723

GEARING

Frank H. Benge, Norristown, Pa., assignor to Continental-Diamond Fibre Company, Newark, Del., a corporation of Delaware Application August 13, 1935, Serial No. 35,994

9 Claims. (Cl. 74—445)

This invention relates to composite gears and, more particularly, to gears formed of metallic and non-metallic materials. The principal object of the invention is to provide an improved gear having the advantages of non-metallic gears but having much greater strength than such gears. The invention is applicable generally to both web and spoke-type gears.

Another object of the invention is to provide an improved silent gear having great strength, which meets the need for quiet operation incident to modern development in the automotive and other industries where non-metallic gears are employed, and which is capable of withstanding the loads encountered in such use.

A more specific object of the invention is to provide a gear having a composite rim formed of complementary metallic and non-metallic parts designed to give silent operation and to provide great strength.

The invention may be clearly understood by reference to the accompanying drawing illustrating a preferred form of the gear. The invention is illustrated as applied to a fibre spoke gear but this is merely for the purpose of disclosure, it being understood that the invention is not thus limited but is capable of general application as above stated.

In the accompanying drawing:

Fig. 1 is a face view of a spoke gear constructed in accordance with the invention;

Fig. 2 is a sectional view taken along line 2—2 of Fig. 1;

Fig. 3 is a fragmentary sectional view taken along line 3—3 of Fig. 1;

Fig. 4 is a fragmentary perspective view of a portion of the gear rim; and

Fig. 5 is a fragmentary sectional view illustrating an alternative embodiment.

Referring to Figs. 1 to 4 of the drawing, the gear illustrated comprises a hub portion 1, a load-transmitting portion 2, a non-metallic rim portion 3, and a metallic rim 4. In accordance with the invention, the non-metallic rim portion 3 and the metallic rim 4 are formed complementary to one another in a manner to provide a composite non-metallic and metallic working surface as will be explained in detail later. The non-metallic rim portion 3 may be formed of any suitable material such as bakelite, hard rubber (where the gear is not subjected to oil), hard wood such as lignum-vitae, leather or rawhide, etc. Preferably, however, the non-metallic rim portion is formed of resin-impregnated fabric in laminated form or more advantageously to small pieces of fabric material impregnated with a synthetic resin binder, for example a phenolic resin, and, more specifically, a phenol-formaldehyde resin. The scrap material resulting from the manufacture of laminated products may be advantageously employed in this instance, since the use of such scrap material, which would otherwise be wasted, effects a saving in the cost of the gear. It is preferable also to form the hub portion 1 and the load-transmitting portion or spokes 2 of the same material as the rim portion 3, these portions of the gear being formed integrally in accordance with the method described hereinafter. The hub portion 1 may surround and firmly bind itself to a metal bushing 5 having serrations 6 on its outer surface to provide the necessary firm bond with the hub. This bushing may be adapted in any suitable manner for fixedly mounting the gear on a rotatable element such as a shaft, as is well known.

The metallic rim 4 may be formed of any suitable metal having the desired strength. Preferably steel is employed in the formation of this rim. The steel rim is firmly attached to and interlocked with the non-metallic rim portion 3 by the provision of transverse recesses 7 and projections or lugs 8 on the inside of the steel rim, as shown clearly in Fig. 1. This provides interdentate portions on the non-metallic rim portion 3 and the metallic rim 4 thus securely locking these parts together. It will be understood, of course, that any other suitable means may be employed to effect this desired purpose.

In accordance with the invention, the metallic rim 4 is provided with at least one inner recess 9 which preferably extends annularly or circumferentially entirely about the gear. The recess 9 extends outwardly into the portion of the metal rim which is to constitute the working portion of the gear. It is further preferred that the recess 9 shall extend substantially to the pitch line of the gear teeth. The non-metallic rim portion 3 is formed complementary to the metallic rim so that the non-metallic rim portion has an outer annular projection 10 seated in the recess 9 and extending into the toothed part of the metallic rim substantially to the pitch line of the gear teeth. In this manner, each of the gear teeth 11 is compositely formed and comprises a non-metallic section 12 (see Figs. 2 and 4) and a metallic section 13. Thus each of the teeth has working surfaces, as shown clearly in Fig. 4, having metallic and non-metallic sections with the non-metallic section extending substantially to the pitch line of the tooth. The surfaces 14 between the teeth are also compositely formed, each such surface comprising a non-metallic portion 15 and metallic portions 16 on opposite sides of the metallic portion. It will be seen, therefore, that the entire working surface of the gear is compositely formed of metallic and non-metallic sections. This structure eliminates the noise which is inherently present in the operation of metallic gears, and at the same time the desired strength of the metallic gear is had, by virtue of the metallic rim, in a gear which is formed mostly of non-metallic material, such as resin-impregnated fabric or pieces thereof. By having the non-metallic rim portion 3 extend substantially to the pitch line of the gear teeth, it is found that very quiet operation is obtained.

In Fig. 5, there is illustrated an alternative embodiment in which the metallic rim 4a is provided with a pair of recesses 9a and the non-metallic rim portion 3a has outer projections 10a seated in the said recesses. Otherwise, the structure is substantially the same as that above described. The invention contemplates broadly the provision of any desired complementary formation of the non-metallic rim portion and the metallic rim, with the non-metallic rim portion extending into the working portion of the metallic rim so as to provide a composite metallic and non-metallic working surface.

The gear provided by this invention may be manufactured in any suitable manner. For example, the method disclosed and claimed in copending application, Serial No. 89,677, filed July 8, 1936, may be employed, in which case the metallic rim and the non-metallic material may be placed together in a mold and heat and pressure may be applied to mold the said material and to convert it into its final form.

A gear constructed in accordance with the invention is far superior to the ordinary composite gear made entirely of non-metallic material and yet retains the desired qualities of such gear, such as quiet operation and economy of production. Comparative tests have shown that the gear of this invention will outlast the ordinary composite gear in the ratio of approximately 20 to 1. In a specific case, under a certain test load, an ordinary composite gear ran for only five hours before failure, whereas a gear constructed according to the invention showed no indications of failure after one hundred hours. The cost of manufacture of the present gear is not much greater than the cost of manufacture of the ordinary composite gear, and the increased cost is fully warranted by the improved results obtained.

Although the invention has been described with reference to certain specific embodiments, it is obviously susceptible to modifications such as may occur to persons skilled in the art.

I claim:

1. A composite machine element, such as a gear, comprising a non-metallic rim portion, a hub portion, a load-transmitting portion connecting said rim and hub portions, and a metallic rim surrounding said rim portion and attached thereto, said non-metallic rim portion and said metallic rim having complementary working portions cooperatively arranged to provide a composite non-metallic and metallic working surface.

2. A composite machine element, such as a gear, comprising a non-metallic rim portion, a hub portion, a load-transmitting portion connecting said rim and hub portions, and a metallic rim surrounding said rim portion and attached thereto, said metallic rim having at least one inner recess extending outwardly into the working portion of the said rim, and said non-metallic rim portion having an outer projection seated in said recess and extending into the working portion of said metallic rim.

3. A compositie gear, comprising a non-metallic portion, a hub portion, a load-transmitting portion connecting said rim and hub portions, and a metallic rim surrounding said rim portion and attached thereto, said non-metallic rim portion and said metallic rim having complementary toothed portions cooperatively arranged to provide a composite non-metallic and metallic tooth portion.

4. A composite gear, comprising a non-metallic rim portion, a hub portion, a load-transmitting portion connecting said rim and hub portions, and a toothed metallic rim surrounding said rim portion and attached thereto, said metallic rim having at least one inner annular recess extending outwardly through a portion of the toothed part of the said rim, and said non-metallic rim portion having an outer annular projection seated in said recess and extending into the toothed part of said metallic rim.

5. A composite gear, comprising a non-metallic rim portion, a hub portion, a load-transmitting portion connecting said rim and hub portions, and a toothed metallic rim surrounding said rim portion and attached thereto, said metallic rim having at least one inner annular recess extending outwardly substantially to the pitch line of the teeth on said rim, and said non-metallic rim portion having an outer annular projection seated in said recess and extending substantially to the pitch line of the teeth on said metallic rim.

6. A composite gear, comprising a rim portion composed of interspersed pieces of fibrous material and a binder, a hub portion, a load-transmitting portion connecting said rim and hub portions, and a toothed metallic rim surrounding said rim portion and attached thereto, said metallic rim having at least one inner annular recess extending outwardly substantially to the pitch line of the teeth on said rim, and said fibrous rim portion having an outer annular projection seated in said recess and extending substantially to the pitch line of the teeth on said metallic rim.

7. A composite gear, comprising a rim portion composed of interspersed pieces of fibrous material impregnated with synthetic resin, a hub portion, a load-transmitting portion connecting said rim and hub portions, and a toothed metallic rim surrounding said rim portion and attached thereto, said metallic rim having at least one inner annular recess extending outwardly substantially to the pitch line of the teeth on said rim, and said fibrous rim portion having an outer annular projection seated in said recess and extending substantially to the pitch line of the teeth on said metallic rim.

8. A composite gear, comprising a rim portion composed of interspersed pieces of fibrous material impregnated with phenolic resin in its infusible stage, a hub portion, a load-transmitting portion connecting said rim and hub portions, and a toothed metallic rim surrounding said rim portion and attached thereto, said metallic rim having at least one inner annular recess extending outwardly substantially to the pitch line of the teeth on said rim, and said fibrous rim portion having an outer annular projection seated in said recess and extending substantially to the pitch line of the teeth on said metallic rim.

9. A composite gear, comprising a non-metallic rim portion, a hub portion, a load-transmitting portion connecting said rim and hub portions, and a toothed metallic rim surrounding said rim portion and attached thereto, said metallic rim having a plurality of inner annular recesses extending outwardly through a portion of the toothed part of the said rim, and said non-metallic rim portion having a plurality of outer annular projections seated respectively in said recesses and extending into the toothed part of said metallic rim.

FRANK H. BENGE.